(12) United States Patent
Lin et al.

(10) Patent No.: US 11,610,326 B2
(45) Date of Patent: Mar. 21, 2023

(54) SYNTHESIZING 3D HAND POSE BASED ON MULTI-MODAL GUIDED GENERATIVE NETWORKS

(71) Applicant: TENCENT AMERICA LLC, Palo Alto, CA (US)

(72) Inventors: Shih-Yao Lin, Palo Alto, CA (US); Kun Wang, San Jose, CA (US); Hui Tang, Mountain View, CA (US); Chao Huang, Palo Alto, CA (US); Lianyi Han, Palo Alto, CA (US); Wei Fan, New York, NY (US)

(73) Assignee: TENCENT AMERICA LLC, Palo Alto, CA (US)

( * ) Notice: Subject to any disclaimer, the term of this patent is extended or adjusted under 35 U.S.C. 154(b) by 197 days.

(21) Appl. No.: 17/120,461

(22) Filed: Dec. 14, 2020

(65) Prior Publication Data

US 2022/0189050 A1    Jun. 16, 2022

(51) Int. Cl.
| | | |
|---|---|---|
| *G06T 7/564* | (2017.01) | |
| *G06T 9/20* | (2006.01) | |
| *G06T 7/73* | (2017.01) | |
| *G06T 19/00* | (2011.01) | |
| *G06T 9/00* | (2006.01) | |

(52) U.S. Cl.
CPC ............ *G06T 7/564* (2017.01); *G06T 7/75* (2017.01); *G06T 9/002* (2013.01); *G06T 9/20* (2013.01); *G06T 19/00* (2013.01); *G06T 2207/10024* (2013.01); *G06T 2207/20081* (2013.01); *G06T 2207/30196* (2013.01); *G06T 2219/004* (2013.01)

(58) Field of Classification Search
None
See application file for complete search history.

(56) References Cited

U.S. PATENT DOCUMENTS

| | | | | |
|---|---|---|---|---|
| 11,024,060 | B1* | 6/2021 | Ma | G06F 18/214 |
| 11,403,800 | B1* | 8/2022 | Prokudin | G06F 18/2148 |
| 2015/0186716 | A1 | 7/2015 | Litvak et al. | |
| 2015/0278589 | A1* | 10/2015 | Mazurenko | G06V 20/64 382/103 |
| 2016/0307032 | A1* | 10/2016 | Butler | G06V 40/107 |
| 2020/0327693 | A1 | 10/2020 | Arimatsu et al. | |

(Continued)

OTHER PUBLICATIONS

M. Oberweger, P. Wohlhart and V. Lepetit, "Generalized Feedback Loop for Joint Hand-Object Pose Estimation," in IEEE Transactions on Pattern Analysis and Machine Intelligence, vol. 42, No. 8, pp. 1898-1912, Aug. 1, 2020, doi: 10.1109/TPAMI.2019.2907951. (Year: 2020).*

(Continued)

*Primary Examiner* — James A Thompson
(74) *Attorney, Agent, or Firm* — Sughrue Mion, PLLC

(57) ABSTRACT

Systems and methods for obtaining hand images are provided. A method, performed by at least one processor that implements at least one network, includes obtaining a single source image, a three-dimensional (3D) hand pose of a first hand in the single source image, and a 3D target hand pose; and generating an image of a second hand, that has an appearance of the first hand and a pose of the 3D target hand pose, based on the single source image, the 3D hand pose, and the 3D target hand pose.

20 Claims, 7 Drawing Sheets

(56) References Cited

U.S. PATENT DOCUMENTS

2020/0372668 A1   11/2020  Lin et al.
2020/0380720 A1*  12/2020  Dixit ...................... G06T 7/194

OTHER PUBLICATIONS

L. Chen et al., "DGGAN: Depth-image Guided Generative Adversarial Networks for Disentangling RGB and Depth Images in 3D Hand Pose Estimation," 2020 IEEE Winter Conference on Applications of Computer Vision (WACV), 2020, pp. 400-408, doi: 10.1109/WACV45572.2020.9093380. (Year: 2020).*
International Search Report dated Sep. 28, 2021 in International Application No. PCT/US2021/039032.
Written Opinion of the International Searching Authority dated Sep. 28, 2021 in International Application No. PCT/US2021/039032.
Zhenyu Wu et al., "MM-Hand: 3D-Aware Multi-Modal Guided Hand Generative Network for 3D Hand Pose Synthesis", Poster Session A2: Deep Learning for Multimedia, 2020, pp. 2508-2516, Retrieved from: URL: <https://dl.acm.org/doi/pdf/10.1145/3394171.3413555> (9 pages total).

* cited by examiner

SYNTHESIZING 3D HAND POSE BASED ON MULTI-MODAL GUIDED GENERATIVE NETWORKS

FIELD

Embodiments of the present disclosure are directed to generating hand images, and more particularly, synthesizing realistic, diverse, and 3D pose-preserving hand images under the guidance of 3D pose information.

BACKGROUND 3D hand pose estimation is an important and active research topic due to its versatile applications in sign language recognition, human-computer interaction (HCI) for healthcare, and entertainment. Some HCI application such as typing would even require higher accuracy in hand pose estimation. Traditionally, HCI applications reply on depth sensor to capture hand information and infer hand poses. In the past few years, there has been growing interest in HCI application that specifically require pose estimation/tracking from single RGB images, usually to take advantage of the ubiquity of RGB cameras.

Data Augmentation for Hand Pose Estimation

Generative adversarial networks (GANs) have demonstrated strong promise in synthesizing training data. For example, Shrivastava et al. proposes SimGAN, which improves the realism of a simulator's rendered data by using unlabeled real data while preserving the annotation information from the simulator. See Shrivastava et al., "Learning from simulated and unsupervised images through adversarial training," 2017 IEEE Conference on Computer Vision and Pattern Recognition (CVPR) (2017). The processed data by SimGAN are then leveraged to train a hand pose estimator. Also, Mueller et al. presents GeoConGAN, whose generated images preserves their hand pose by a geometric consistency loss. See Mueller et al, "GANerated hands for real-time 3d hand tracking from monocular rgb," 2018 IEEE Conference on Computer Vision and Pattern Recognition (CVPR) (2018). These data augmentation approaches focus on image translation from the synthetic hands to real hands (based on an existing synthetic simulator). Zimmermann et al. introduces the first large-scale, multiview hand image dataset, which includes both 3D hand pose and shape annotations. See Zimmerman et al., "FreiHAND: A Dataset for Markerless Capture of Hand Pose and Shape from Single RGB Images," arXiv (2019). The annotation is achieved by an iterative, semi-automated "human-in-the-loop" approach, which includes hand fitting optimization to infer the 3D pose and shape for each sample.

Pose Guided Person Image Generation

Li et al. proposes to estimate dense and intrinsic 3D appearance flow to guide the transfer of pixels between poses better. See Li et al., "Dense intrinsic appearance flow for human pose transfer," 2019 IEEE Conference on Computer Vision and Pattern Recognition (CVPR) (2019). Li generates 3D flow by fitting a 3D model to the given pose pair and project them back to the 2D plane to compute the dense appearance flow for training. Song et al. [20] addresses unsupervised person image generation by decomposing it into semantic parsing transformation and appearance generation. See Song et al., "Unsupervised Person Image Generation with Semantic Parsing Transformation", 2019 IEEE Conference on Computer Vision and Pattern Recognition (CVPR) (2019). Zhu et al. proposes a progressive pose attention transfer network composed of a cascaded Pose-Attentional Transfer Blocks (PATBs). See Zhu et al., "Progressive Pose Attention Transfer for Person Image Generation", 2019 IEEE Conference on Computer Vision and Pattern Recognition (CVPR) (2019). Liu et al. tackles the human motion imitation, appearance transfer, and novel view synthesis within a unified framework. See Liu et al., "Liquid Warping GAN: A Unified Framework for Human Motion Imitation, Appearance Transfer and Novel View Synthesis," arXiv (2019). Unlike pose guided person images generation, pose guided hand generation can be much more subtle and difficult, due to the inherently strong self-similarity and the self-occlusion.

3D Hand Pose Estimation from a Single Image

Zimmermann et al. proposes the first learning-based approach to estimate the 3D hand pose from a single RGB image. The approach in Zimmermann et al. consists of three building blocks: HangSegNet for obtaining hand mask by segmentation, PoseNet for localizing a set of hand keypoints in score maps, and PosePrior network for estimating 3D structure conditioned on the score maps. Cai et al. proposes a weakly-supervised method to generate depth maps from predicted 3D poses, which then serves as weak supervision for 3D pose regression. See Cai et al., "Weakly-supervised 3d hand pose estimation from monocular rgb images," European Conference on Computer Vision (ECCV) (2018). Chen et al. presents a Depth-image Guided GAN (DGGAN) to generate realistic depth maps conditioned on the input RGB image and use the synthesized depth maps to regularize the 3D hand pose estimators. See, Chen et al., "DGGAN: Depth-image Guided Generative Adversarial Networks for Disentangling RGB and Depth Images for 3D hand Pose Estimation," Winter Conference on Applications of Computer Vision (WACV) (2020).

SUMMARY 3D hand pose estimation from a single view camera is an important but challenging task, due to self-occlusion and the lack of depth information. A promising solution may be to train hand pose estimators on large-scale RGB image sets aided by accurate 3D hand key-point annotations, which have been too expensive to acquire in the real world. Due to the inherent depth ambiguity, building a sizeable real-world hand dataset with accurate 3D annotations is one major challenge of 3D hand pose estimation.

Embodiments of the present disclosure may provide solutions to the above problems and/or other problems.

Embodiments of the present disclosure may provide a learning-based approach to synthesize realistic, diverse, and 3D pose-preserving hand images, under the guidance of 3D pose information. Embodiments of the present disclosure may provide a 3D-aware multi-modal guided hand generative network (MM-Hand), together with a novel geometry-based curriculum learning strategy.

With the help of an external dataset with paired depth maps and 3D hand poses, embodiments of the present disclosure may train a depth map generator to synthesize depth maps based on any given 3D poses. Embodiments of the present disclosure can generate realistic, diverse, and pose preserving hand images based on any given 3D poses and synthetic depth maps. Qualitative and quantitative results show that the hand images generated by MM-Hand of embodiments of the present disclosure resemble the ground truth hand images in both appearance and pose. Moreover, the hand images augmented by the MM-Hand of embodiments of the present disclosure can consistently improve the 3D hand pose estimation results under different reduction portion.

Embodiments of the present disclosure may generate realistic hand images from 3D poses and synthetic depth maps.

Embodiments of the present disclosure may generate hand images under the guidance of 3D poses, improving the realism, diversity, and 3D pose-preserving of the generated images simultaneously.

Embodiments of the present disclosure may include training with a novel geometry-based curriculum learning strategy. Starting with easy pose-images pairs, training task difficulty may be gradually increased.

According to one or more embodiments, a method performed by at least one processor that implements at least one network is provided. The method includes: obtaining a single source image, a three-dimensional (3D) hand pose of a first hand in the single source image, and a 3D target hand pose; and generating an image of a second hand, that has an appearance of the first hand and a pose of the 3D target hand pose, based on the single source image, the 3D hand pose, and the 3D target hand pose.

According to an embodiment, the method further includes obtaining a contour map of the 3D hand pose, and a second contour map of the 3D target hand pose; and obtaining a first depth map of the 3D hand pose, and a second depth map of the 3D target hand pose, wherein the generating includes generating the image of the second hand based on the single source image, the first contour map, the second contour map, the first depth map, and the second depth map.

According to an embodiment, the method further includes modality encoding the single source image, the first contour map, the second contour map, the first depth map, and the second depth map, such as to obtain an image modality of the single source image, a contour map modality, and a depth map modality, wherein the generating includes generating the image of the second hand based on the image modality of the single source image, the contour map modality, and the depth map modality.

According to an embodiment, the method further includes progressively updating the image modality of the single source image, the contour map modality, and the depth map modality a plurality of times such as to obtain an updated image modality, an updated contour map modality, and an updated depth map modality, wherein the generating includes generating the image of the second hand based on the updated image modality.

According to an embodiment, the generating includes generating the image of the second hand by image modality decoding the updated image modality.

According to an embodiment, the image modality of the single source image, the contour map modality, and the depth map modality are progressively updated by a plurality of convolutional blocks of the at least one network that are arranged in series.

According to an embodiment, each of the plurality of convolutional blocks includes: residual neural network (ResNet) blocks that are configured to receive an iteration of the image modality, an iteration of the contour map modality, and an iteration of the depth map modality, respectively, and to obtain a transformed image modality, a transformed contour map modality, and a transformed depth map modality, respectively, an attention mask that is obtained based on the transformed contour map and the transformed depth map, and indicates an importance of each element in the image modality; and an image modality update operation that multiplies the transformed image modality with the attention mask such as to obtain an output, and adds the iteration of the image modality to the output to obtain a subsequent iteration of the image modality as the iteration of the image modality for a subsequent one of the plurality of convolutional blocks or as the updated image modality.

According to an embodiment, the plurality of convolutional blocks are multiple cascaded Multi-Stream Attentional Blocks (MABs).

According to an embodiment, the method further includes training the at least one network to generate images of hands by inputting, into the at least one network, pairs of images that each include a target hand image and a source hand image, wherein the pairs are inputted in order from one of the pairs that has a smallest 3D pose distance, between images of the one of the pairs, to another one of the pairs that has a largest 3D pose distance, between images of the another one of the pairs.

According to an embodiment, the training further includes obtaining a joint loss function that includes an adversarial loss function, an appearance loss function, and a 3D hand pose estimation task loss function.

According to one or more embodiments, a system is provided. The system includes: at least one processor, and memory including computer code, the computer code including network code configured to cause the at least one processor to implement at least one network that is configured to obtain a single source image, a three-dimensional (3D) hand pose of a first hand in the single source image, and a 3D target hand pose, wherein the network code includes image generating code that is configured to cause the at least one processor to generate an image of a second hand, that has an appearance of the first hand and a pose of the 3D target hand pose, based on the single source image, the 3D hand pose, and the 3D target hand pose.

According to an embodiment, the network code further includes 3D pose embedding code configured to cause the at least one processor to: obtain a first contour map of the 3D hand pose, and a second contour map of the 3D target hand pose; and obtain a first depth map of the 3D hand pose, and a second depth map of the 3D target hand pose, and the image generating code is configured to cause the at least one processor to generate the image of the second hand based on the single source image, the first contour map, the second contour map, the first depth map, and the second depth map.

According to an embodiment, the network code further includes modality encoding code configured to cause the at least one processor to modality encode the single source image, the first contour map, the second contour map, the first depth map, and the second depth map, such as to obtain an image modality of the single source image, a contour map modality, and a depth map modality, and the image generating code is configured to cause the at least one processor to generate the image of the second hand based on the image modality of the single source image, the contour map modality, and the depth map modality.

According to an embodiment, the network code further includes progressive transfer code configured to cause the at least one processor to progressively update the image modality of the single source image, the contour map modality, and the depth map modality a plurality of times such as to obtain an updated image modality, an updated contour map modality, and an updated depth map modality, and the image generating code is configured to cause the at least one processor to generate the image of the second hand based on the updated image modality.

According to an embodiment, the image generating code is configured to cause the at least one processor to generate the image of the second hand by image modality decoding the updated image modality.

According to an embodiment, the progressive transfer code is configured the at least one processor to implement a plurality of convolutional blocks, of the at least one network, that are arranged in series and configured progressively update the image modality of the single source image, the contour map modality, and the depth map modality.

According to an embodiment, each of the plurality of convolutional blocks includes: residual neural network (ResNet) blocks that are configured to receive an iteration of the image modality, an iteration of the contour map modality, and an iteration of the depth map modality, respectively, and to obtain a transformed image modality, a transformed contour map modality, and a transformed depth map modality, respectively; an attention mask that is obtained based on the transformed contour map and the transformed depth map, and indicates an importance of each element in the image modality; and an image modality update operation that multiplies the transformed image modality with the attention mask such as to obtain an output, and adds the iteration of the image modality to the output to obtain a subsequent iteration of the image modality as the iteration of the image modality for a subsequent one of the plurality of convolutional blocks or as the updated image modality.

According to an embodiment, the computer code further includes training code that is configured to cause the at least one processor to train the at least one network to generate images of hands by inputting, into the at least one network, pairs of images that each include a target hand image and a source hand image, wherein the pairs are inputted in order from one of the pairs that has a smallest 3D pose distance, between images of the one of the pairs, to another one of the pairs that has a largest 3D pose distance, between images of the another one of the pairs.

According to an embodiment, the training code includes loss function code that is configured to cause the at least one processor to obtain a joint loss function that includes an adversarial loss function, an appearance loss function, and a 3D hand pose estimation task loss function.

According to one or more embodiments, a non-transitory computer-readable medium storing computer code is provided. The computer code is configured to, when executed by at least one processor, cause the at least one processor to: implement at least one network that is configured to obtain a single source image, a three-dimensional (3D) hand pose of a first hand in the single source image, and a 3D target hand pose; and generate an image of a second hand, that has an appearance of the first hand and a pose of the 3D target hand pose, based on the single source image, the 3D hand pose, and the 3D target hand pose.

BRIEF DESCRIPTION OF THE DRAWINGS

Further features, the nature, and various advantages of the disclosed subject matter will be more apparent from the following detailed description and the accompanying drawings in which.

DETAILED DESCRIPTION

Figure 1:
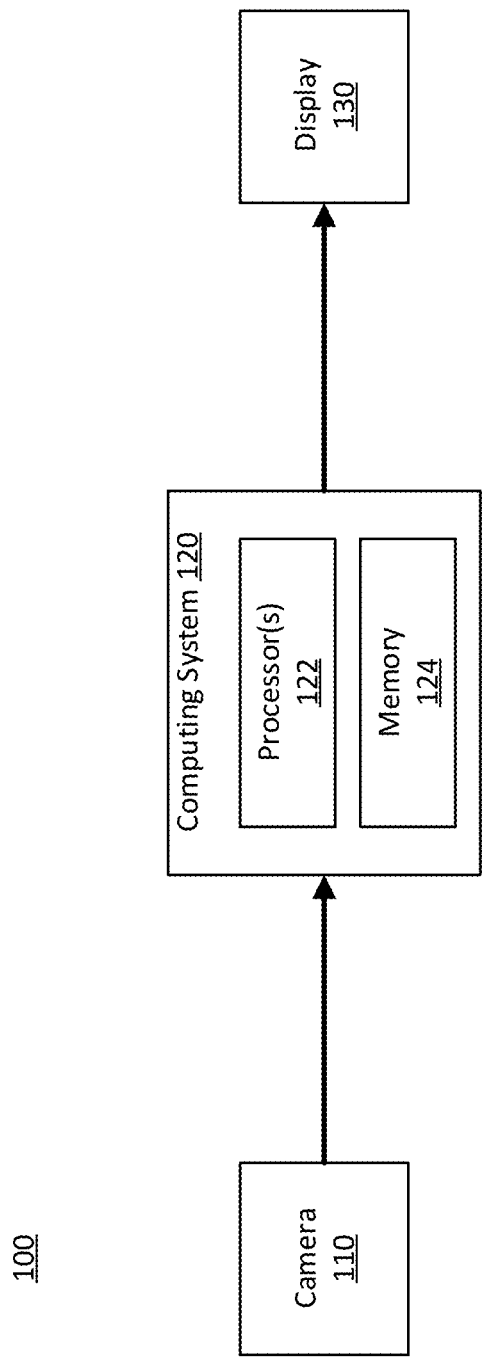
FIG. 1 is a schematic illustration of a system according to embodiments of the present disclosure.
Figure 3:
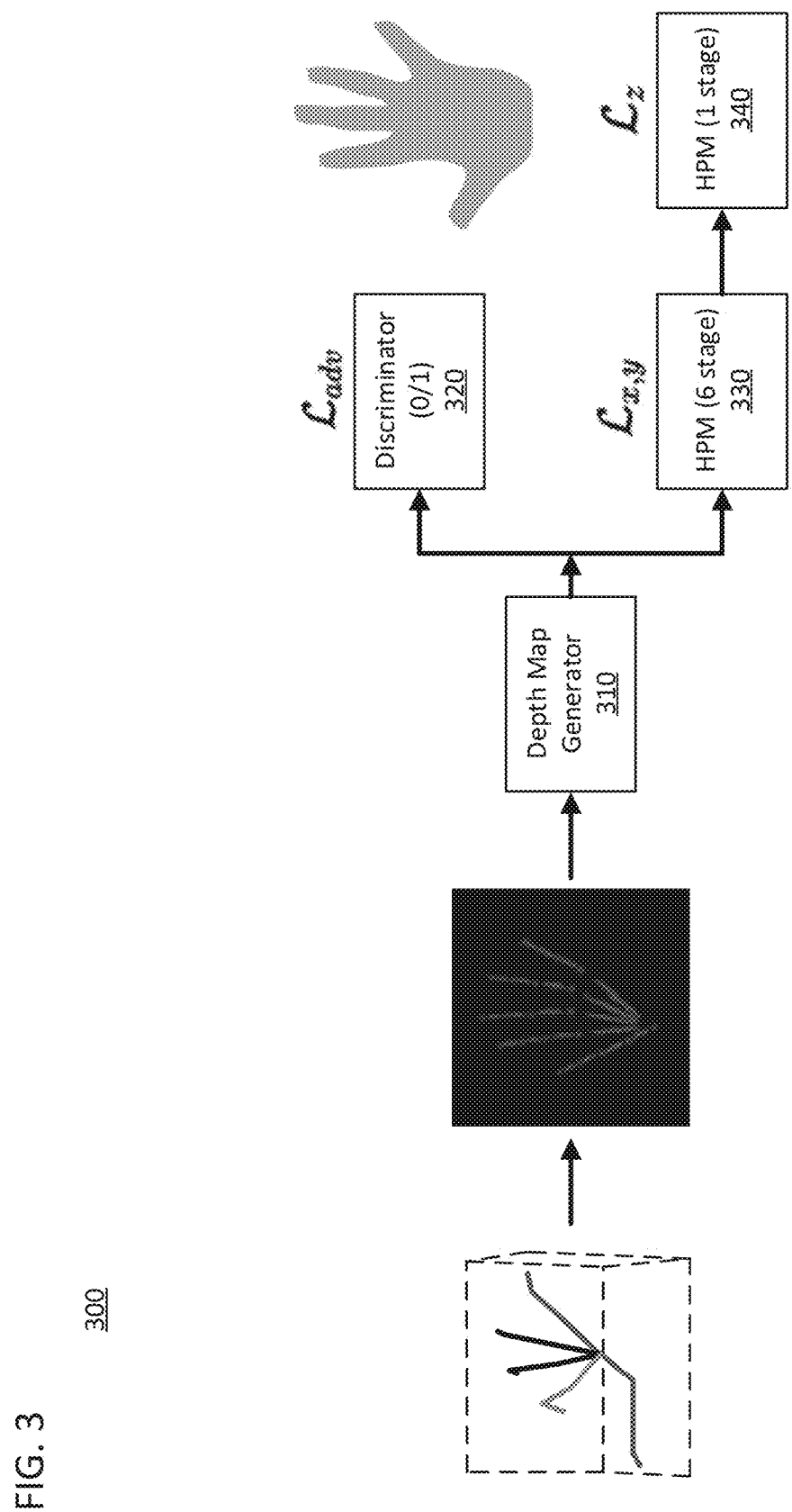
FIG. 3 is a schematic illustration of a depth map generation model according to an embodiment.
Figure 4:
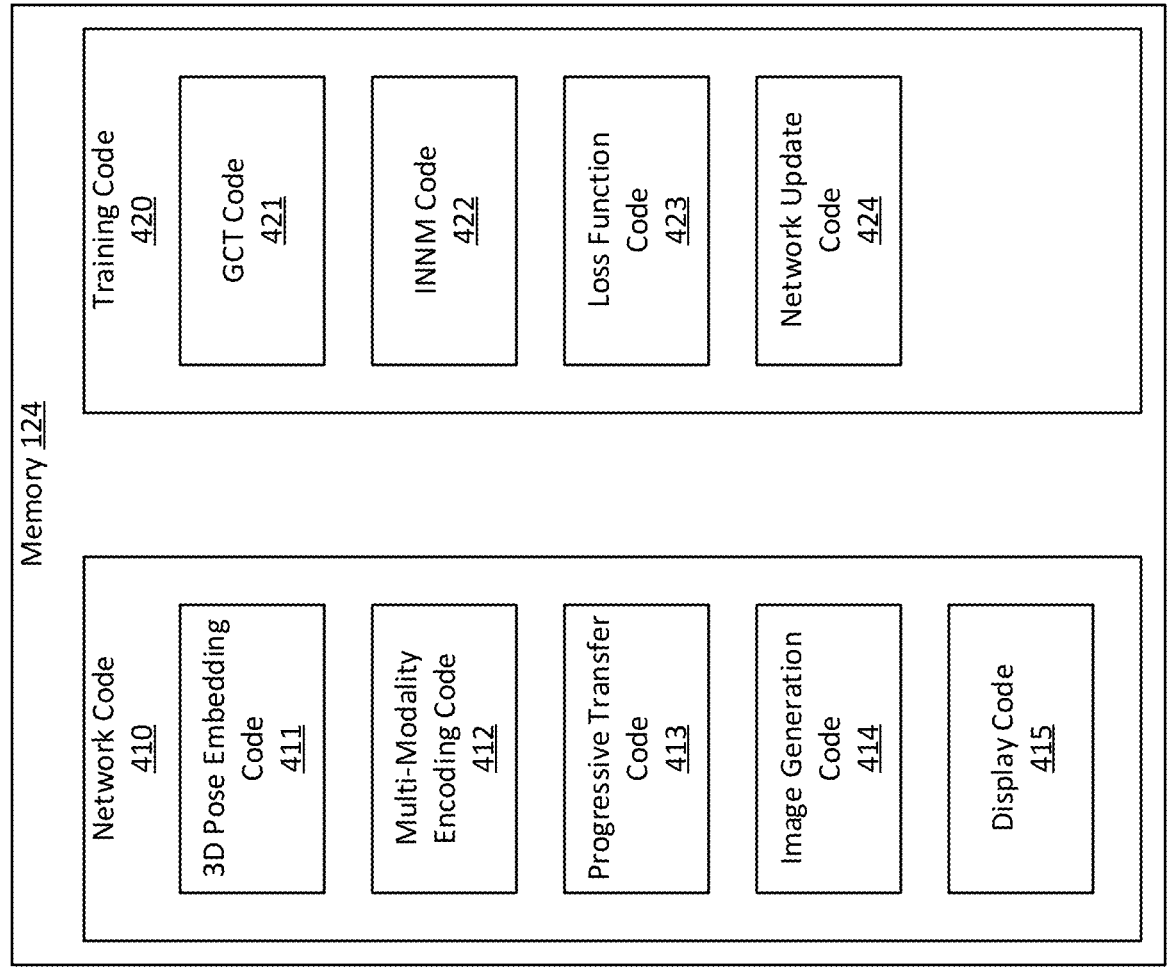
FIG. 4 is a schematic illustration of computer code according to embodiments of the present disclosure.

According to embodiments, with reference to FIG. 1, a system 100 is provided. The system 100 may include, for example, a camera 110, a computing system 120, and a display 130. The camera 110 may be, for example, an RGB camera. The camera 110 may be configured to obtain image data, and transmit the image data via a wired or wireless connection to the computing system 120. The computing system 120 may include at least one processor 122 and memory storing computer code. The computer code may be configured to, when executed by the at least one processor 122, cause the at least one processor 122 to perform the processes of the computing system 120 such as those described below with respect to FIGS. 2A-3. An example diagram of the computer code is illustrated in FIG. 4. The computing system 120 may also include, or be connected to, the display 130, and may be configured to cause the display 130 to display results of the processes of the computing system 120. The computing system 120 may be connected to the display 130 via a wired or wireless connection.

Figure 2A:
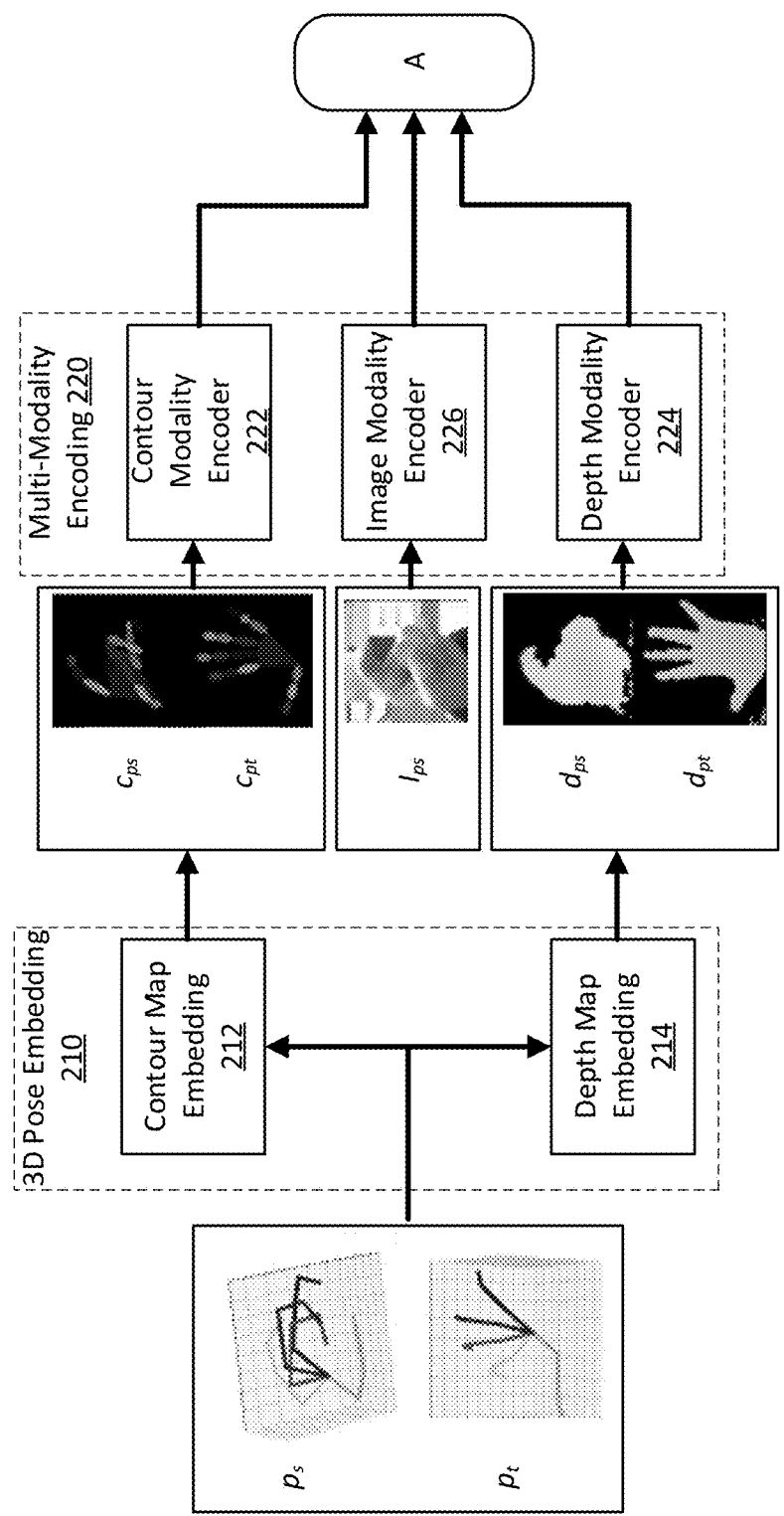
FIG. 2A is a schematic illustration of a first part of a network system according to an embodiment.
Figure 2B:
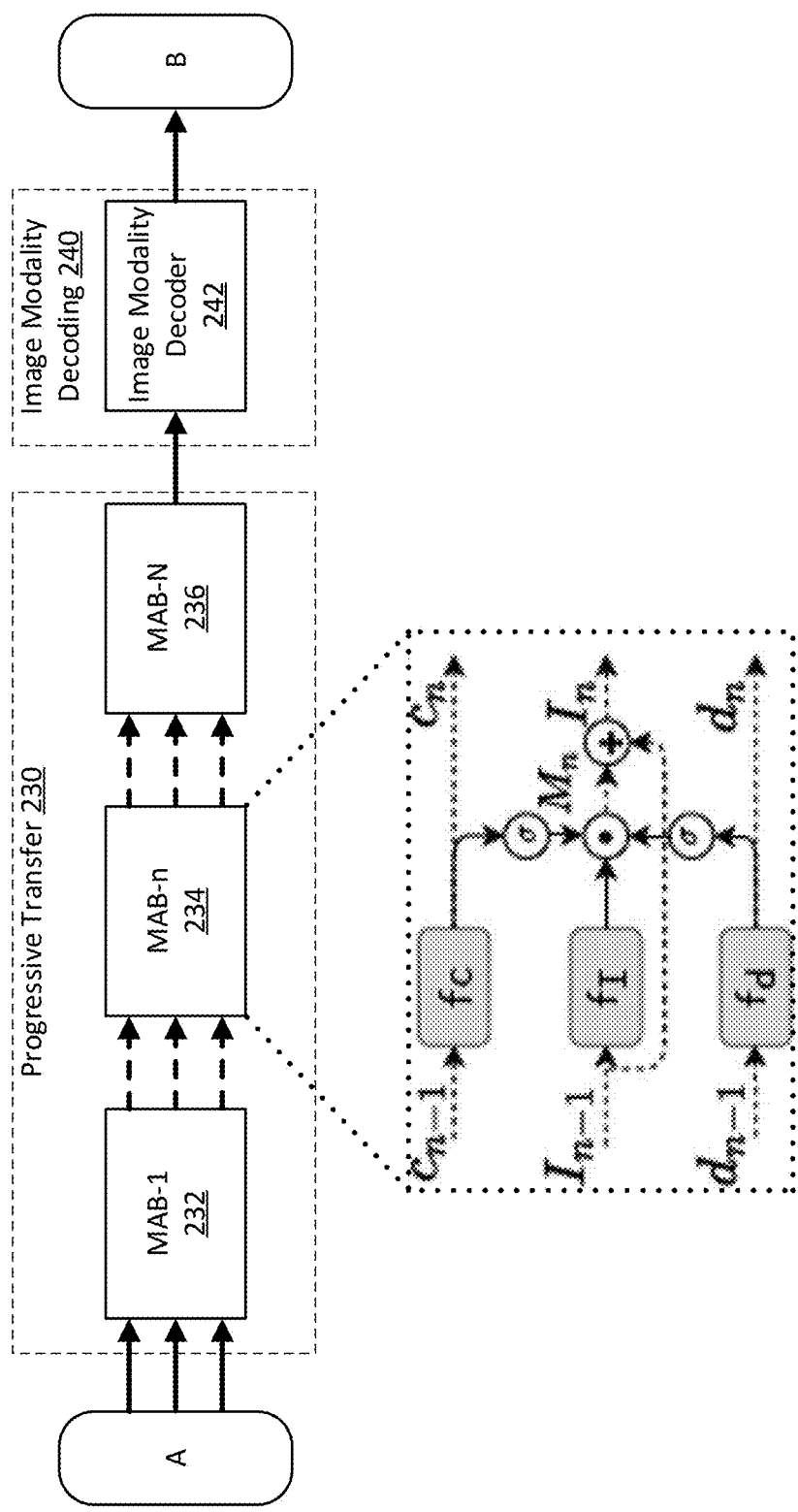
FIG. 2B is a schematic illustration of a second part of the network system according to an embodiment.
Figure 2C:
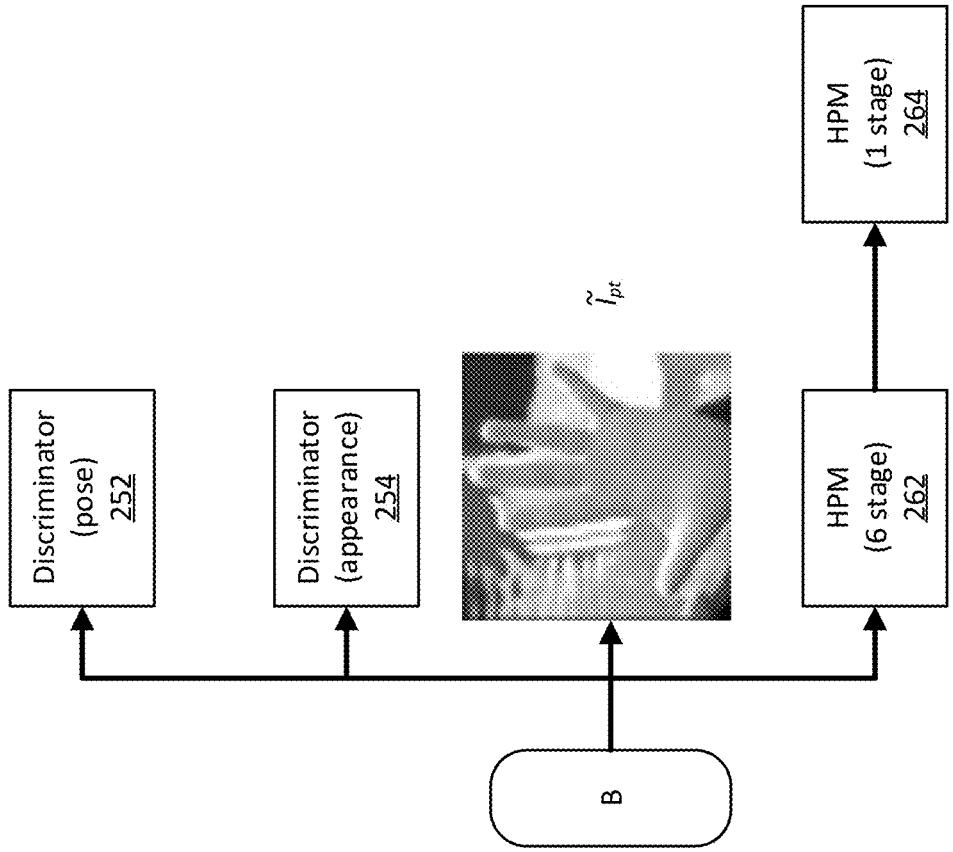
FIG. 2C is a schematic illustration of a third part of the network system according to an embodiment.

With reference to FIGS. 2A-C, embodiments of the present disclosure may include a 3D-Aware Multi-modal Guided Hand Generative Network (MM-Hand) 200 that comprises, for example, four modules: 3D pose embedding 210, multi-modality encoding 220, progressive transfer 230, and image modality decoding 240. According to embodiments, the MM-Hand 200 (including the modules thereof) may be implemented by the computer code of the memory 124 and the at least one processor 122 of FIG. 1.

Given a 3D pose $p_t$ (a target 3D hand pose), and a source image $I_{ps}$ (a source hand image) under a 3D pose $p_s$ (a source 3D pose), the MM-Hand 200 may generate a new image $\tilde{I}_{pt}$ following the appearance of the source image $I_{ps}$, under the guidance of the 3D pose $p_s$ and the 3D pose $p_t$. For example, according to embodiments, the source image $I_{ps}$ may be an image of a hand captured by the camera 110, the 3D pose $p_s$ may be a pose representation of the pose illustrated in the source image $I_{ps}$, the 3D pose $p_t$ may be a pose representation of the target pose of an image to be generated, and the image $\tilde{I}_{pt}$ may be an image generated based on the source image $I_{ps}$, the 3D pose $p_s$, and the 3D pose $p_t$, and which may be displayed on the display 130 and may have an appearance of the hand in the source image $I_{ps}$.

The image $\tilde{I}_{pt}$ may be a generated hand image and may resemble a ground truth hand image $I_{pt}$ in both visual realism and pose consistency. Embodiments of the present disclosure may evaluate visual realism by natural image quality metrics such as, for example, Structural Similarity Index Measure (SSIM) and IS. Pose consistency may be approximated by pose joints alignment (e.g., PCKb). Considering both visual realism and pose consistency, embodiments of the present disclosure may evaluate the quality of generated hand images on the visual task of 3D hand pose estimation.

[I. 3D Pose Embedding 210]

The 3D pose embedding 210 may include contour map embedding 212 and depth map embedding 214 which use the 3D pose $p_s$ and the 3D pose $p_t$ as inputs. The contour map embedding 210 may be a non-trainable module, and the depth map embedding 214 may be a deconvolutional module.

Contour Map Embedding 212: Given a camera's intrinsic matrix K and extrinsic matrix [R|−RC], embodiments of the present disclosure may obtain the projection matrix P=K[R|−RC] which transforms homogeneous 3D world coordinates to homogeneous 2D image coordinates to obtain contour maps $c_{ps}$ and $c_{pt}$. Firstly, embodiments may represent K joints of the 3D poses $p_s$ and $p_t$ with 2D coordinates with a sparse pose map, using erosion and dilation. Secondly, embodiments may connect the key-points on fingers with solid ellipsoids using different colors. Lastly, embodiments may form a palm surrogate by connecting a polygon from the base of each finger and the wrist. Embodiments may generate the contour maps of $c_{ps}$ and $c_{pt}$ as the embeddings of the 3D poses $p_s$ and $p_t$, respectively. The contour maps $c_{ps}$ and $c_{pt}$ may include the solid ellipsoids using difference colors and the palm surrogate that is formed by the polygon.

Depth Map Embedding 214: With the help of external datasets with paired depth maps and 3D hand poses, embodiments of the present disclosure can learn a depth map generator which converts a 3D hand pose to a depth map. For example, the depth map embedding 214 may include the depth map generator 310 illustrated in FIG. 3. With reference to FIGS. 2A and 3, the depth map generator 310 of the present disclosure may take a raw 3D hand pose(s) (e.g. 3D poses $p_s$ and $p_t$) as input and output a respective depth map(s) (e.g. depth maps $d_{ps}$ and $d_{pt}$).

With reference to FIG. 3, embodiments of the present disclosure may implement a depth map generation model 300 that includes the depth map generator 310, a discriminator 320, a 6-stage HPM 330, and a 1-stage HPM 340. The 6-stage HPM 330 and the 1-stage HPM 340 may be a pair of 2D/3D key-point estimators. An output of the discriminator 320 may be an adversarial loss $\mathcal{L}_{adv}$, an output of the 6-stage HPM 330 may be 2D hand pose estimation loss $\mathcal{L}_{x,y}$, and an output of the 1-stage HPM 330 may be a depth estimation loss $\mathcal{L}_z$.

[II. Multi-Modality Encoding 220]

With reference to FIG. 2A, the multi-modality encoding 220 may be implemented by a contour modality encoder 222, an image modality encoder 226, and a depth modality encoder 224. According to an embodiment, the contour modality encoder 222, the image modality encoder 226, and the depth modality encoder 224 may each be a convolutional module that consistently adopts two convolution layers for performing their respective modality encoding functions of the contour maps $c_{ps}$ and $c_{pt}$, the source image $I_{ps}$, and the depth maps $d_{ps}$ and $d_{pt}$. Before encoding, MM-Hand 200 may concatenate the contour maps $c_{ps}$ and $c_{pt}$, and the depth maps $d_{ps}$ and $d_{pt}$ as shown in Equation (1) below:

$$c_0 = f_c^e(c_{ps} \| c_{pt}),\ d_0 = f_d^e(d_{ps} \| d_{pt})\ \text{and}\ I_0 = f_I^e(I_{ps}), \quad (1)$$

where $f_c^e$, $f_d^e$, and $f_I^e$ are the contour modality encoder 222, the depth modality encoder 224, and the image modality encoder 226, respectively.

[III. Progressive Transfer 230]

With reference to FIG. 2B, the progressive transfer 230 may be implemented by a progressive transfer module and may receive modalities of the contour maps $c_{ps}$ and $c_{pt}$, source image $I_{ps}$, and depth maps $d_{ps}$ and $d_{pt}$ as inputs. The progressive transfer module may use the ResNet Generator proposed in Isola et al., "Image-to-image translation with conditional adversarial networks", 2017 IEEE Conference on Computer Vision and Pattern Recognition (CVPR) (2017), and Johnson et al., "Perceptual losses for real-time style transfer and super-resolution", European Conference on Computer Vision (ECCV) (2016), which are both herein incorporated by reference in their entirety. The progressive transfer 230 may comprise or consist of multiple cascaded Multi-Stream Attentional Blocks (MABs), which may be variants of the residual neural network (ResNet) blocks in Isola et al and Johnson et al. The MABs may be similar to the Pose Attention Transfer Block (PATB) proposed in Zhu et al., "Progressive Pose Attention Transfer for Person Image Generation", CVPR (2019), which is herein incorporated by reference in its entirety.

Starting from the initial image modality $I_0$, the initial contour map modality $c_0$, and the initial depth modality $d_0$, MM-Hand 200 may progressively update these three modalities through a sequence of MABs (e.g. MAB-1 (232) . . . MAB-n (234) . . . MAB-N (236)) of the progressive transfer 230. Then, MM-Hand 200 may use deconvolution to decode an output image modality $I_N$ to generate the image $\tilde{I}_{pt}$ (the generated hand image). The final contour map modality $c_N$ and the final depth map modality $d_N$ may be discarded after inference. All MABs of the progressive transfer 230 may share an identical structure. One MAB's output may be the input for the next MAB block. For example, the input of the n-th block may include modalities $I_{n-1}$, $c_{n-1}$ and $d_{n-1}$. Example modules within each MAB of the progressive transfer 230 are described below.

A. Attention Masks

The MABs may include attention masks $M_n$, whose values may be between 0 and 1, that indicate the importance of every element in the image modality. An attention mask $M_n$ may be computed from the contour modality $c_{n-1}$ and the depth modality $d_{n-1}$. The contour modality $c_{n-1}$ may incorporate both the source contour map $c_{ps}$ and the target contour map $c_{pt}$. Likewise, the depth modality $d_{n-1}$ may incorporate both the source depth map $d_{ps}$ and the target depth map $d_{pt}$. The attention mask $M_n$ may be computed as element-wise product of $\sigma(f_c(c_{n-1}))$ and $\sigma(f_d(d_{n-1}))$, where $\sigma$ is an element-wise sigmoid function and $f_c$ and $f_d$ are ResNet blocks. Specifically, the attention masks $M_n$ may be obtained based on the Equation (2) shown below:

$$M_n = \sigma(f_c(c_{n-1})) \odot \sigma(f_d(d_{n-1})). \quad (2)$$

B. Image Modality Update

By multiplying the transformed image codes with the attention mask $M_n$, image code $I_n$ at certain locations may be either preserved or suppressed. $I_{n-1}$ may be added to the output of the elementwise product via a residual connection. The residual connection may help preserve the original image modality. With reference to Equation (3) shown below, $f_I$ is again a ResNet Block. The image modality $I_n$ may be updated based on the Equation (3) shown below:

$$I_n = M_n \odot f_I(I_{n-1}) + I_{n-1}. \quad (3)$$

[IV. Image Modality Decoding 240]

With reference to FIGS. 2B-C, the image modality decoding 240 may be implemented by an image modality decoder 242. The image modality decoder 242 may take the output image modality $I_N$ from the N-th MAB (e.g. MAB-N 236 of FIG. 2B), and generate the image $\tilde{I}_{pt}$ from $I_N$. According to embodiments, the image modality decoder 242 may be a deconvolutional module.

[V. Discriminators and HPMs]

With reference to FIG. 2C, the MM-Hand 200 may also include a pose discriminator 252 and an appearance discriminator 254, which may be denoted as $D_a$ and $D_p$, respectively. $D_a(I_{ps}, \tilde{I}_{pt})$ may determine and describe how well $\tilde{I}_{pt}$ resembles the source image $I_{ps}$ in appearance. $D_p(p_t, \tilde{I}_{pt})$ may determine and describe how well $\tilde{I}_{pt}$ is aligned with the target pose $p_t$. The MM-Hand 200 may also include a 6-stage HPM 262 and a 1-stage HPM 264 in series.

The pose discriminator 252, the appearance discriminator 254, the 6-stage HPM 262, and the 1-stage HPM 264 may be used in training, may be convolutional modules, and may be used to calculate losses as described below.

[VI. Training]

The MM-Hand 200, according to embodiments of the present disclosure, may be trained using geometry-based curriculum training and inference with nearest neighbor match as described below. According to embodiments, the memory 124 and one or more of the at least one processors 122 may be configured to perform the training of the MM-Hand 200.

Given two 3D hand poses u and v, the pose distance between u and v may be defined as shown in Equation (4) below:

$$d(u, v) = \frac{1}{\pi} \cos^{-1} \left( \frac{\langle f(u), f(v) \rangle}{\|f(u)\| \|f(v)\|} \right) \quad (4)$$

where f(•) describes the "identity" of a hand pose. Each hand pose may be expressed as the concatenation vector of its 3D key points (e.g. 21 3D key points).

A. Geometry-based Curriculum Training (GCT):

Based on the observation that end point error (EPE) is positively correlated with pose distance, the level of difficulty to generate a hand image $\tilde{I}_{pt}$ from a source hand image $I_{ps}$ may be positively correlated with the 3D pose distance between the 3D pose $p_s$ (source 3D pose) and the 3D pose $p_t$ (target 3D hand pose). Hence, in the training stage of MM-Hand 200, embodiments of the present disclosure may first randomly make pairs of source and target hand images. Then, the embodiments may compute the 3D pose distance for each pair of images. For each training epoch, MM-Hand 200 may be fed by a data loader with hand pairs progressively from the easiest (smallest pose distance) pair to the hardest (largest pose distance) pair during the training.

B. Inference with Nearest Neighbor Match (INNM):

In an inference stage of the training, given a target 3D hand pose $p_t$, embodiments of the present disclosure may find the best matched source hand image $I_{ps}$ in the training hand images whose 3D pose $p_s$ is closest to the target 3D hand pose $p_t$ in pose distance.

C. Loss Function

Embodiments of the present disclosure may calculate a joint loss function. Embodiments of the present disclosure may use the joint loss function to train the MM-Hand 200. According to embodiments, the joint loss function of Equation (5), shown below, may be a nested sum of loss functions including the loss functions of Equations (6)-(7) shown below:

$$\mathcal{L}_{joint} = \alpha \mathcal{L}_{adv} + \mathcal{L}_{app} + \mathcal{L}_{pose} \quad (5)$$

$$\mathcal{L}_{app} = \tau_1 \mathcal{L}_1 + \tau_2 \mathcal{L}_p \quad (6)$$

$$\mathcal{L}_{pose} = \gamma_1 \mathcal{L}_{x,y} + \gamma_2 \mathcal{L}_z \quad (7)$$

where $\mathcal{L}_{adv}$ denotes the adversarial loss, $\mathcal{L}_{app}$ measures the appearance difference of the generated hand image ($\tilde{I}_{pt}$) and the target hand image ($I_{pt}$), and $\mathcal{L}_{pose}$ is a 3D hand pose estimation task loss. $\alpha$, $\tau_{1,2}$, $\gamma_{1,2}$ may represent the corresponding weights and may be determined empirically. The adversarial loss $\mathcal{L}_{adv}$ may be defined as shown below in Equation (8):

$$\mathcal{L}_{adv} = \mathbb{E}_{I_{ps},I_{pt},p_t}\{\log[D_a(I_{ps},I_{pt}) \cdot D_p(p_t, I_{pt})]\} + \mathbb{E}_{I_{ps},\tilde{I}_{pt},p_t}\{\log[(1-D_a(I_{ps},\tilde{I}_{pt})) \cdot (1-D_p(p_t, \tilde{I}_{pt}))]\}, \quad (8)$$

where $\tilde{I}_{pt}$ G($I_{ps}$, $p_s$, $p_t$), G(.) may be the progressive transfer module of the progressive transfer 230 illustrated in FIG. 2B. $\mathcal{L}_1$ may denote the pixel-wise l1 loss computed between the generated hand image ($\tilde{I}_{pt}$) and the target hand image ($I_{pt}$). $\mathcal{L}_p$ may be a perceptual loss used in style transfer and super resolution, and may be defined as shown below in Equation (9):

$$\mathcal{L}_p = \frac{1}{C_i H_i W_i} \|\phi_i(\tilde{I}_{pt}) - \phi_i(I_{pt})\|_2^2, \quad (9)$$

where $\phi_i$ is the ith layer of a pretrained network. $\mathcal{L}_{x,y}$ may denote the 2D hand pose estimation loss and may be defined as shown below in Equation (10):

$$\mathcal{L}_{x,y} = \frac{1}{6K} \sum_{s=1}^{6} \sum_{i=1}^{K} \|H_i^s - H_i^*\|_p^2 \quad (10)$$

where $\{H^*_i\}_{i=1}^K$ (K=21) is the ground truth 2D poses in heat maps and 6 is the number of stages in HPM. $\mathcal{L}_z$ may denote the depth estimation loss and may be defined as shown below in Equation (11):

$$\mathcal{L}_z = \frac{1}{K} \sum_{i=1}^{K} \begin{cases} \frac{1}{2}(Z_i - Z_i^*)^2, & |Z_i - Z_i^*| \leq 1 \\ |Z_i - Z_i^*| - 0.5, & \text{otherwise} \end{cases}, \quad (11)$$

where $\{Z^*_i\}_{i=1}^K$ (K=21) is the ground truth relative depth.

With reference to FIG. 4, the memory 124 may store computer code configured to cause the at least one processor 122 (refer to FIG. 1) of the system 100 to perform any number of the processes described above. For example, the memory 124 may store network code 410 and training code 420. The network code 410 may be configured to cause the at least one processor 122 to implement the MM-Hand 200 (and the modules thereof). The training code 420 may configured to cause the at least one processor 122 to train the MM-Hand 200.

According to embodiments, the network code 410 may include, for example, 3D pose embedding code 411, multi-modality encoding code 412, progressive transfer code 413, and image generating code 414 that are configured to cause the at least one processor 122 to implement the 3D pose embedding 210, the multi-modality encoding 220, the progressive transfer 230, and the image modality decoding 240, respectively. The network code 410 may also include display code 415 that is configured to cause the at least one processor 122 to cause the display 130 to display an image generated.

According to embodiments, the training code 420 may include, for example, GCT code 421, INNM code 422, and lose function code 423 that are configured to cause the at least one processor 122 to perform the Geometry-based Curriculum Training (GCT), Inference with Nearest Neighbor Match (INNM), and the loss function calculation as described in embodiments of the present disclosure, respectively. The training code 420 may include network update code 424 that is configured to cause MM-Hand (or any number of modules thereof) to update based on the loss function calculated.

The processes of the present disclosure, described above, can be implemented as computer software using computer-readable instructions and physically stored in one or more computer-readable media. For example, FIG. 5 shows a computer system 900 suitable for implementing the computing system 120 of the disclosed subject matter.

The computer software can be coded using any suitable machine code or computer language, that may be subject to assembly, compilation, linking, or like mechanisms to create code including instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 5:
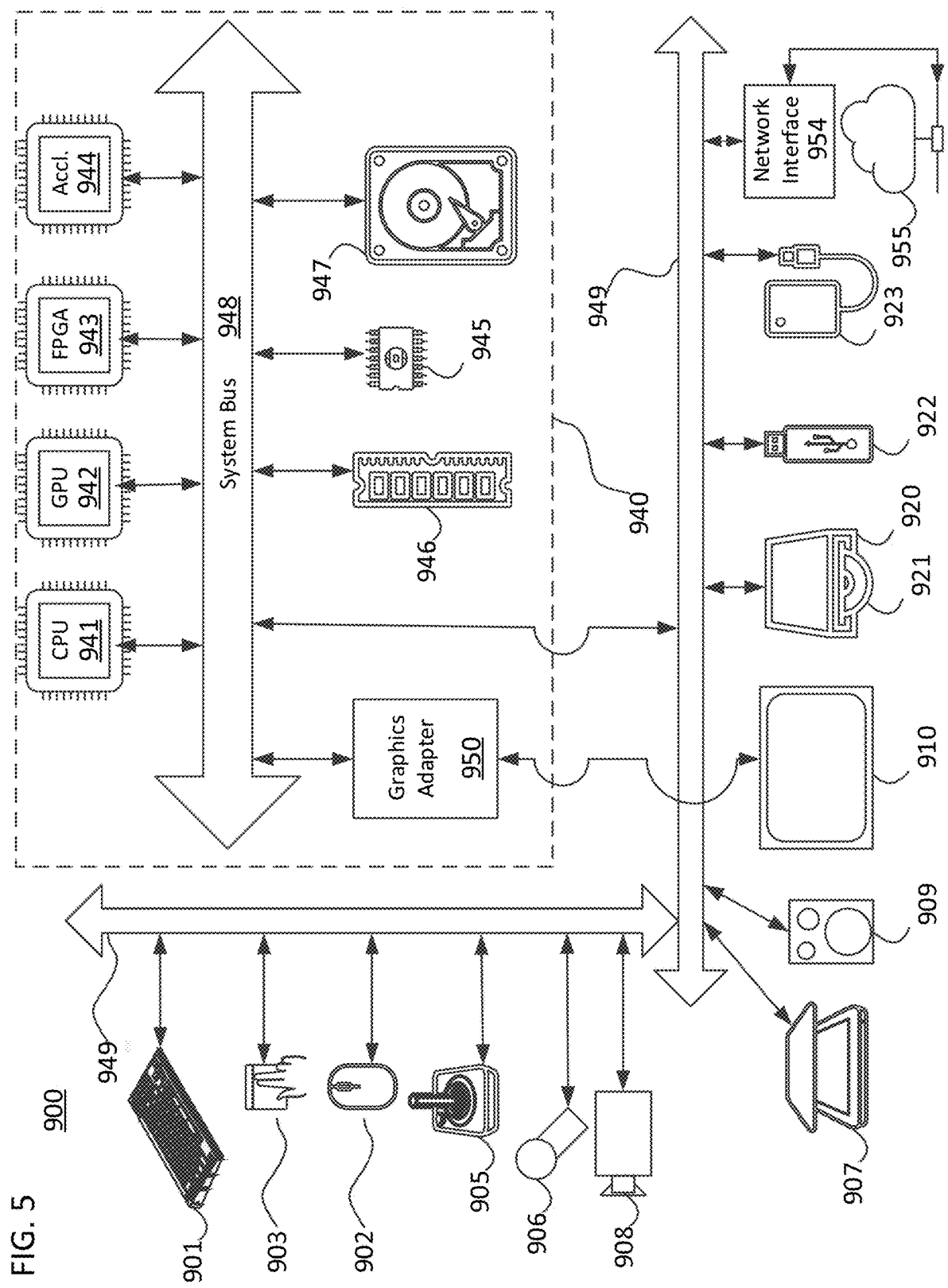
FIG. 5 is a schematic illustration of a computer system according to embodiments of the present disclosure.

The components shown in FIG. 5 for computer system 900 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 900.

Computer system 900 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 901, mouse 902, trackpad 903, touch-screen 910, joystick 905, microphone 906, scanner 907, and camera 908.

Computer system 900 may also include certain human interface output devices. Such human interface output devices may be stimulating the senses of one or more human users through, for example, tactile output, sound, light, and smell/taste. Such human interface output devices may include tactile output devices for example tactile feedback by the touch-screen 910, data-glove, or joystick 905, but there can also be tactile feedback devices that do not serve as input devices. For example, such devices may be audio output devices (such as: speakers 909), headphones (not depicted)), visual output devices (such as screens 910 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted), and printers (not depicted).

Computer system 900 can also include human accessible storage devices and their associated media such as optical media including CD/DVD ROM/RW 920 with CD/DVD or the like media 921, thumb-drive 922, removable hard drive or solid state drive 923, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 900 can also include interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses 949 (such as, for example USB ports of the computer system 900; others are commonly integrated into the core of the computer system 900 by attachment to a system bus as described below (for example Ethernet interface into a PC computer system or cellular network interface into a smartphone computer system). Using any of these networks, computer system 900 can communicate with other entities. Such communication can be uni-directional, receive only (for example, broadcast TV), uni-directional send-only (for example CANbus to certain CANbus devices), or bi-directional, for example to other computer systems using local or wide area digital networks. Such communication can include communication to a cloud computing environment 955. Certain protocols and protocol stacks can be used on each of those networks and network interfaces as described above.

Aforementioned human interface devices, human-accessible storage devices, and network interfaces 954 can be attached to a core 940 of the computer system 900.

The core 940 can include one or more Central Processing Units (CPU) 941, Graphics Processing Units (GPU) 942, specialized programmable processing units in the form of Field Programmable Gate Areas (FPGA) 943, hardware accelerators 944 for certain tasks, and so forth. These devices, along with Read-only memory (ROM) 945, Random-access memory (RAM) 946, internal mass storage such as internal non-user accessible hard drives, SSDs, and the like, may be connected through a system bus 948. In some computer systems, the system bus 948 can be accessible in the form of one or more physical plugs to enable extensions by additional CPUs, GPU, and the like. The peripheral devices can be attached either directly to the core's system bus 948, or through a peripheral bus 949. Architectures for a peripheral bus include PCI, USB, and the like. A graphics adapter 950 may be included in the core 940.

CPUs 941, GPUs 942, FPGAs 943, and accelerators 944 can execute certain instructions that, in combination, can make up the aforementioned computer code. That computer code can be stored in ROM 945 or RAM 946. Transitional data can be also be stored in RAM 946, whereas permanent data can be stored for example, in the mass storage 947 that is internal. Fast storage and retrieve to any of the memory devices can be enabled through the use of cache memory, that can be closely associated with one or more CPU 941, GPU 942, mass storage 947, ROM 945, RAM 946, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system 900 having architecture, and specifically the core 940 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 940 that are of non-transitory nature, such as core-internal mass storage 947 or ROM 945. The software implementing various embodiments of the present disclosure can be stored in such devices and executed by core 940. A computer-readable medium can include one or more memory devices or chips, according to particular needs. The software can cause the core 940 and specifically the processors therein (including CPU, GPU, FPGA, and the like) to execute particular processes or particular parts of particular processes described herein, including defining data structures stored in RAM 946 and modifying such data structures according to the processes defined by the software. In addition or as an alternative, the computer system can provide functionality as a result of logic hardwired or otherwise embodied in a circuit (for example: accelerator 944), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several non-limiting example embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method performed by at least one processor that implements at least one network, the method comprising:
    obtaining a single source image that includes a first hand in a first pose, a three-dimensional (3D) hand pose of the first hand in the first pose, and a 3D target hand pose having a second pose that is different from the first pose; and
    making the first hand appear as if in the second pose, instead of the first pose, by generating an image of a second hand, that has an appearance of the first hand and the second pose of the 3D target hand pose, based on the single source image, the 3D hand pose, and the 3D target hand pose.

2. The method of claim 1, further comprising:
    obtaining a contour map of the 3D hand pose, and a second contour map of the 3D target hand pose; and
    obtaining a first depth map of the 3D hand pose, and a second depth map of the 3D target hand pose,
    wherein the generating comprises generating the image of the second hand based on the single source image, the first contour map, the second contour map, the first depth map, and the second depth map.

3. The method of claim 2, further comprising:
    modality encoding the single source image, the first contour map, the second contour map, the first depth map, and the second depth map, such as to obtain an image modality of the single source image, a contour map modality, and a depth map modality,
    wherein the generating comprises generating the image of the second hand based on the image modality of the single source image, the contour map modality, and the depth map modality.

4. The method of claim 3, further comprising:
    progressively updating the image modality of the single source image, the contour map modality, and the depth map modality a plurality of times such as to obtain an updated image modality, an updated contour map modality, and an updated depth map modality,
    wherein the generating comprises generating the image of the second hand based on the updated image modality.

5. The method of claim 4, wherein
    the generating comprises generating the image of the second hand by image modality decoding the updated image modality.

6. The method of claim 4, wherein
    the image modality of the single source image, the contour map modality, and the depth map modality are progressively updated by a plurality of convolutional blocks of the at least one network that are arranged in series.

7. The method of claim 6, wherein each of the plurality of convolutional blocks includes:
    residual neural network (ResNet) blocks that are configured to receive an iteration of the image modality, an iteration of the contour map modality, and an iteration of the depth map modality, respectively, and to obtain a transformed image modality, a transformed contour map modality, and a transformed depth map modality, respectively,
    an attention mask that is obtained based on the transformed contour map and the transformed depth map, and indicates an importance of each element in the image modality; and
    an image modality update operation that multiplies the transformed image modality with the attention mask such as to obtain an output, and adds the iteration of the image modality to the output to obtain a subsequent iteration of the image modality as the iteration of the image modality for a subsequent one of the plurality of convolutional blocks or as the updated image modality.

8. The method of claim 6, wherein the plurality of convolutional blocks are multiple cascaded Multi-Stream Attentional Blocks (MABs).

9. The method of claim 1, further comprising:
    training the at least one network to generate images of hands by inputting, into the at least one network, pairs of images that each include a target hand image and a source hand image,
    wherein the pairs are inputted in order from one of the pairs that has a smallest 3D pose distance, between images of the one of the pairs, to another one of the pairs that has a largest 3D pose distance, between images of the another one of the pairs.

10. The method of claim 9, wherein the training further comprises:
obtaining a joint loss function that includes an adversarial loss function, an appearance loss function, and a 3D hand pose estimation task loss function.

11. A system comprising:
at least one processor, and
memory comprising computer code, the computer code comprising network code configured to cause the at least one processor to implement at least one network that is configured to obtain a single source image that includes a first hand in a first pose, a three-dimensional (3D) hand pose of the first hand in the first pose, and a 3D target hand pose having a second pose that is different from the first pose,
wherein the network code comprises image generating code that is configured to cause the at least one processor to make the first hand appear as if in the second pose, instead of the first pose, by generating an image of a second hand, that has an appearance of the first hand and the second pose of the 3D target hand pose, based on the single source image, the 3D hand pose, and the 3D target hand pose.

12. The system of claim 11, wherein
the network code further comprises 3D pose embedding code configured to cause the at least one processor to:
obtain a first contour map of the 3D hand pose, and a second contour map of the 3D target hand pose; and
obtain a first depth map of the 3D hand pose, and a second depth map of the 3D target hand pose, and
the image generating code is configured to cause the at least one processor to generate the image of the second hand based on the single source image, the first contour map, the second contour map, the first depth map, and the second depth map.

13. The system of claim 12, wherein
the network code further comprises modality encoding code configured to cause the at least one processor to modality encode the single source image, the first contour map, the second contour map, the first depth map, and the second depth map, such as to obtain an image modality of the single source image, a contour map modality, and a depth map modality, and
the image generating code is configured to cause the at least one processor to generate the image of the second hand based on the image modality of the single source image, the contour map modality, and the depth map modality.

14. The system of claim 13, wherein
the network code further comprises progressive transfer code configured to cause the at least one processor to progressively update the image modality of the single source image, the contour map modality, and the depth map modality a plurality of times such as to obtain an updated image modality, an updated contour map modality, and an updated depth map modality, and
the image generating code is configured to cause the at least one processor to generate the image of the second hand based on the updated image modality.

15. The system of claim 14, wherein
the image generating code is configured to cause the at least one processor to generate the image of the second hand by image modality decoding the updated image modality.

16. The system of claim 14, wherein
the progressive transfer code is configured the at least one processor to implement a plurality of convolutional blocks, of the at least one network, that are arranged in series and configured progressively update the image modality of the single source image, the contour map modality, and the depth map modality.

17. The system of claim 16, wherein each of the plurality of convolutional blocks includes:
residual neural network (ResNet) blocks that are configured to receive an iteration of the image modality, an iteration of the contour map modality, and an iteration of the depth map modality, respectively, and to obtain a transformed image modality, a transformed contour map modality, and a transformed depth map modality, respectively;
an attention mask that is obtained based on the transformed contour map and the transformed depth map, and indicates an importance of each element in the image modality; and
an image modality update operation that multiplies the transformed image modality with the attention mask such as to obtain an output, and adds the iteration of the image modality to the output to obtain a subsequent iteration of the image modality as the iteration of the image modality for a subsequent one of the plurality of convolutional blocks or as the updated image modality.

18. The system of claim 11, wherein
the computer code further comprises training code that is configured to cause the at least one processor to train the at least one network to generate images of hands by inputting, into the at least one network, pairs of images that each include a target hand image and a source hand image,
wherein the pairs are inputted in order from one of the pairs that has a smallest 3D pose distance, between images of the one of the pairs, to another one of the pairs that has a largest 3D pose distance, between images of the another one of the pairs.

19. The system of claim 18, wherein the training code comprises loss function code that is configured to cause the at least one processor to obtain a joint loss function that includes an adversarial loss function, an appearance loss function, and a 3D hand pose estimation task loss function.

20. A non-transitory computer-readable medium storing computer code that is configured to, when executed by at least one processor, cause the at least one processor to:
implement at least one network that is configured to obtain a single source image that includes a first hand in a first pose, a three-dimensional (3D) hand pose of the first hand in the first pose, and a 3D target hand pose having a second pose that is different from the first pose; and
make the first hand appear as if in the second pose, instead of the first pose, by generating an image of a second hand, that has an appearance of the first hand and the second pose of the 3D target hand pose, based on the single source image, the 3D hand pose, and the 3D target hand pose.

* * * * *